United States Patent
Reckwerdt et al.

(10) Patent No.: US 8,948,253 B2
(45) Date of Patent: Feb. 3, 2015

(54) NETWORKED IMAGE/VIDEO PROCESSING SYSTEM

(75) Inventors: Bill Reckwerdt, Saratoga, CA (US); Wei Li, Cupertino, CA (US)

(73) Assignee: Flextronics AP, LLC, San Jose, CA (US)

( * ) Notice: Subject to any disclaimer, the term of this patent is extended or adjusted under 35 U.S.C. 154(b) by 615 days.

(21) Appl. No.: 13/327,663

(22) Filed: Dec. 15, 2011

(65) Prior Publication Data

US 2013/0156095 A1 Jun. 20, 2013

(51) Int. Cl.
 H04N 7/12 (2006.01)
 H04N 21/234 (2011.01)
 H04N 21/647 (2011.01)

(52) U.S. Cl.
 CPC ... *H04N 21/23418* (2013.01); *H04N 21/64738* (2013.01)
 USPC .................................................. 375/240.02

(58) Field of Classification Search
 CPC .................. H04N 21/23418; H04N 21/64738
 USPC ................................ 375/240, 240.01, 240.02
 See application file for complete search history.

(56) References Cited

U.S. PATENT DOCUMENTS

| | | | |
|---|---|---|---|
| 2008/0059888 A1 | 3/2008 | Dunko | |
| 2009/0278806 A1 | 11/2009 | Duarte et al. | |
| 2009/0298548 A1 | 12/2009 | Kim et al. | |
| 2010/0060664 A1 | 3/2010 | Kilpatrick, II et al. | |
| 2010/0227650 A1 | 9/2010 | Kim et al. | |
| 2011/0003616 A1 | 1/2011 | Gorsica et al. | |
| 2011/0134269 A1 | 6/2011 | Kim | |
| 2011/0211758 A1 | 9/2011 | Joshi et al. | |
| 2011/0317031 A1 | 12/2011 | Honda | |
| 2012/0242599 A1 | 9/2012 | Seo et al. | |
| 2013/0021262 A1 | 1/2013 | Cheng | |
| 2013/0076961 A1 | 3/2013 | Sirpal | |
| 2013/0156091 A1 | 6/2013 | Li et al. | |
| 2013/0156092 A1 | 6/2013 | Reckwerdt et al. | |

OTHER PUBLICATIONS

Google Image Result for Fujitsu Dual Screen Phone, published date unknown, [retrieved Apr. 18, 2011], 1 page. Retrieved from: www.google.com/imgres?imgurl=http://wvvw.computerriver.com/images/dual-screen-phone.jpg.

Google Image Result for LG Dual Touch Screen Concept Phone by Eugene Kim, published date unknown, [retrieved Apr. 18, 2011], 1 page. Retrieved from: www.google.com/imgres?imgurl=http://fgadgets.com/wp-content/uploads/2010/08/lg-dual-touchscreen-phone-Eugene-Kim-01.jpg.

Google Image Result for Fujitsu Dual Screen Phone, published date unknown, [retrieved Apr. 18, 2011], 1 page. Retrieved from: www.google.com/imgres?imgurl=http://www.gsmdome.com/wp-content/uploads/2010/10/fujitsu-dual-screen-phone_w2cP7_54.jpg.

(Continued)

*Primary Examiner* — Allen Wong
(74) *Attorney, Agent, or Firm* — Sheridan Ross P.C.

(57) ABSTRACT

A distributed image/video processing system is disclosed herein wherein one or more of digital image/video recorders (e.g., a digital cameras, video recorders, or smart phones, etc.) are in network communication with central network site for transmitting image or video data thereto. The recorders process their image/video data dependent upon an estimate of a measurement of network bandwidth that is available for transmitting image or video data to the central network site.

22 Claims, 2 Drawing Sheets

(56) References Cited

OTHER PUBLICATIONS

Google Image Result for Kyocera Echo, published date unknown, [retrieved Apr. 18, 2011], 1 page. Retrieved from: www.google.com/imgres?imgurl=http://www.hardwaresphere.com/wp-content/uploads/2011/02/kyocera-echo-dual-screen-android-phone-for-sprint-network.jpg.

Google Image Result for HTC Triple Viper, published date unknown, [retrieved Apr. 18, 2011], 1 page. Retrieved from:www.google.com/imgres?imgurl=http://www.santafemods.com/Forum/AndroidForums/htcTripleViper.png.

Google Image Result for Dual-Screen Phone, [retrieved Apr. 18, 2011], 1 page. Retrieved from: www.google.com/imgres?imgurl=http://www.netshet.org/wp-content/uploads/2011/02/Dual-Scree. . .

Website entitled "DualView TL225 12.2 Megapixel Compact Digital Camera," Samsung, Internet Archive capture Sep. 4, 2011, 3 pages [http://web.archive.org/web/20110904123641/http://www.samsung.com/us/photography/digital-cameras/EC-TL225ZBPOUS].

Website entitled "Lapdock™ for Motorola Atrix," Motorola Mobility, Inc, 2011, [retrieved on Apr. 18, 2011], 1 page. Retrieved from: www.motorola.com/Consumers/US-EN/Consumer-Product-and-Services/Mobile+Ph. . .

Website entitled "Motorola ATRIX 4G Laptop Dock Review," phoneArena.com, posted Mar. 2, 2011, [retrieved on Apr. 18, 2011], 6 pages. Retrieved from: www.phonearena.com/reviews/Motorola-ATRIX-4G-Laptop-Dock-Review_id2667.

Burns, C., "Motorola Atrix 4G Laptop Dock Review," Android Community, Feb. 20, 2011, [retrieved on Apr. 18, 2011], 5 pages. Retrieved from: www.androidcommunity.com/motorola-atrix-4g-laptop-dock-review-20110220/.

Catacchio, "This smartphone has two huge screens . . . that rotate," The Next Web, Inc., Oct. 7, 2010, [retrieved on Jul. 21, 2011], 2 page. Retrieved from: www.thenextweb.com/asia/2010/10/07/this-smartphone-has-two-huge-screens-that-rotate/.

Posted by Harman03, "Kyocera Echo Dual-screen Android Phone," posted 4 weeks from Apr. 18, 2011, [retrieved on Apr. 18, 2011], 3 pages. Retrieved from: www.unp.me/f106/kyocera-echo-dual-screen-android-phone-143800/.

Kanumuri et al. "Temporal Flicker Reduction and Denoising in Video using Sparse Directional Transforms," Proceedings from SPIE7073, Applications of Digital Image Processing XXXI, 2008, 11 pages.

Stein, S., "How does the Motorola Atrix 4G Lapdock compare with a laptop?" Crave—CNET, Feb. 9, 2011 [retrieved on Apr. 18, 2011], 7 pages. Retrieved from: www.news.cnet.com/8301-17938_105-20031251-1. html.

Official Action for U.S. Appl. No. 13/627,400, mailed Jan. 17, 2014, 12 pages.

NETWORKED IMAGE/VIDEO PROCESSING SYSTEM

FIELD OF THE INVENTION

The present application is directed to distributed processing of data on a network wherein the processing performed at a client network node is at least partially determined according to network transmission characteristics or constraints, and more particularly, the present application is directed to such distributed processing when the data is image or video data.

BACKGROUND

Processing pictorial (image) and/or video digital data can be both computationally intensive and consume large amounts of data storage. For many communication devices (e.g., mobile phones) having capabilities for generating digital images (photos) and/or videos, these devices have processing and/or storage capacities that are insufficient to appropriately wholly reside on the devices. Accordingly, it is desirable to store and in some cases at least partially process such image/video data at one or more central sites on a communications network wherein such sites have relatively large data processing and storage capacities. However, the network can be significantly degraded if large numbers of network users transmit image/video data to such central network sites due to the corresponding high data volume image/video data that may be transmitted on the network. Accordingly, one solution would be to limit the amount of image/video data that users transmit on the network, e.g., during a day, week or month. This solution has significant drawbacks in that network users increasingly believe that a "smart" telecommunications network should "intelligently" perform user network requests to the degree possible, and further that such requests should be performed without requiring the users to have relatively detailed knowledge of network communications.

Thus, to address the above problem, it is desirable to provide a more "intelligent" technique for managing and transmitting image/video data on a telecommunications network. In particular, it would be desirable to dynamically vary the amount of image/video data that users transmit on the network according to current network transmission characteristics, wherein such dynamic varying of network transmissions is performed substantially transparently to the users, and wherein the presentation or display quality of such image/video data can be substantially maintained.

SUMMARY

A distributed image/video processing system is disclosed herein wherein one or more (preferably a plurality) of digital image or video recorders (each being, e.g., a digital camera, video recorder, or multi-purpose device such as a smart phone, or computer laptop) is in network communication with central network site for transmitting image or video data thereto. The recorders process their image or video data substantially dependent upon an estimate of an amount or measurement of network bandwidth that is available for transmitting the image or video data (or a version thereof) to the central network site. More particularly, the recorders perform image or video processing on such captured image/video data as appropriate to maintain an acceptably efficient (fast) transmission time of the recorder processed image/video data to the central network site. In particular, each such recorder performs image/video enhancement processes and image/video compression techniques in a manner that varies the amount of resulting image/video data transmitted on the network according to a measurement of network bandwidth currently available.

In one embodiment, the phrase "network bandwidth currently available" and similar equivalent phrases such as "available network bandwidth" refers to a difference between an estimated reasonable maximum data rate or through put of the network between two predetermined network connection points, and an estimate of an actual current data rate or through put of the network between the two predetermined network connection points at a particular time or in a particular time interval. Assuming there is at least a general estimate of the data rate or through put of the network between two predetermined network connection points wherein this general estimate is considered to be a reasonable maximum (given that varying network configurations and network traffic balancing may occur), the "available network bandwidth" may be estimated by measuring one or more current network data transmission rates or data throughputs at one or more particular network sites (e.g., one or both of the two predetermined network connection points), determining a composite (e.g., average) current network data transmission rate or data throughput therefrom, and then subtracting the composite current data transmission rate or data through put from the general (maximum) estimate. Alternatively, such a reasonable maximum estimate of the network bandwidth may be determined by using network transmission time delays, e.g., between two network connection points. For example, such a maximum bandwidth estimate may be determined from measuring time delays for one or more pings between, e.g., the two predetermined network connection points as one skilled in the art will understand. For example, if a maximum acceptable time delay between the two network connection points is determined, then an indication of an available network bandwidth may be determined by subtracting a current (or most recent) measurement of a network time delay(s) between the two network connection points from the maximum acceptable time delay to estimate the "available network bandwidth." Note that whereas a measurement of the "available network bandwidth" based on data transmission rates or throughput is monotonically increasing with the above described difference in data transmission rates or throughput, a corresponding measurement of "available network bandwidth" based on network time delays is inversely related to the above described differences network transfer time delays.

In one embodiment, measurements of available network bandwidth may be determined by analyzing historical measurements of network data rates and/or (ping) time delays, and making a determination as to what measurement should be designated as a reasonable maximum estimate of the network bandwidth. For example, such a reasonable maximum estimate may be taken to be, e.g., boundary value between first and second standard deviations of the historical measurements as one skilled in the art will understand.

Accordingly, when available network bandwidth is low (e.g., relative to the type, size or data rate of data to be transferred), such an image/video recorder will perform image/video enhancement processes in a manner that reduces (or does not appreciably increase) the amount of data, and then compresses the enhanced image/video data with an aggressive compression technique that may substantially reduce the amount of resulting image/video data to be transferred on the network to the central network site, thereby reducing the impact on the available network bandwidth over what such impact would be if, e.g., little or no compression where performed. Moreover, in order to maintain the display quality of the image/video data, noise reduction techniques are also applied to the image/video data by the recorder in a manner dependent upon an amount of data compression to be applied prior to network transmission to the central site. For example, more robust noise reduction (also referred to herein as "de-noising") is applied to image data when the recorder determines that a more aggressive data compression technique is to be also applied. Thus, the increased de-noising will negate at least some of the effects of the increased data compression so that data for an acceptable quality of image display can be maintained while reducing the volume of network traffic.

In at least one embodiment, the image/video processing system disclosed herein obtains or reads a first network parameter data indicative of a preferred size of image data for transferring on the network. Since the size of the image initially captured by a recorder is typically available to the recorder, a compression factor can be computed (i.e., size of the capture image divided by preferred image size). Additionally/optionally, a second parameter data indicating the data compression type to perform may be provided via being read from a network transmission (e.g., transmitted from a predetermined network site), or, alternatively, the compression type may be determined by the recorder (e.g., the recorder may determine an available compression type that provides the desired compression factor and is the least lossy). Given such a compression factor, and compression type (e.g., Loss Less, or JPEG), a table (or other data structure) resident at the recorder can be accessed to determine corresponding enhancement processes (and parameters therefor) such as de-noising and sharpening processes to perform.

Note that similar determinations can be made for video data. For example, if the network provides a preferred transmission data rate, then assuming the recorder has access to the video data rate (e.g., Kbps) being received by the recorder, a video compression factor can determined for corresponding transmissions on the network. Additionally, a compression type can be determined either from being read from a network (or network site) transmission, or, alternatively, the compression type may be determined by the recorder, wherein the recorder may determine an available compression type that provides the desired compression factor and is the least lossy.

Accordingly, assuming (i) the recorder has access to one or more of the tables (or corresponding data structures) providing the information for captured image sizes and/or video data rates), and assuming (ii) the recorder also has access to desired or preferred a image/video network transmission attributes (e.g., size or data rate), then such tables can be accessed by the recorder to determine at least the type of de-noising, sharpening, and compression processes to be applied, as well as the parameters for operably configuring each of these processes. Thus, even though much of the description herein is illustrative of such processes being dependent upon available network bandwidth, other known or unknown constraints/conditions (e.g., substantially unrelated to available network bandwidth) may be involved in determining the desired or preferred a image/video network transmission attributes.

In one embodiment, the image/video processing system disclosed herein performs the following steps:
(a) obtaining first data at a first device operably in communication with a network site via a telecommunications network, the first data being image or video data;
(b) obtaining first characteristics of the first data, wherein the characteristics include a size or data rate for the first data;
(c) obtaining second characteristics of a preferred size or data rate for transmitting the first data or a data derived therefrom on the network;
(d) correlating the first characteristics with the second characteristics for operably configuring at least two of a data compression technique, a de-noising technique, and a sharpening technique for transforming the first data or data derived therefrom into corresponding processed data for transmitting on the network;
(e) applying the at least two techniques for transforming the first data;
(f) obtaining history information indicative of transforming the first data to obtain the processed data, wherein the history information includes description information related to the at least two techniques applied for transforming the first data; and
(g) transmitting the processed data and the history information, via the network, to a predetermined network site;
wherein following the transmission, the transmitted history information is accessed for at least decompressing the transmitted processed data when the transmitted processed data is compressed.

In one embodiment, the image/video processing system disclosed herein performs the following steps (a) through (g):
(a) obtaining network data related to a transmission characteristic for a telecommunications network;
(b) obtaining first data at a first device operably in communication with a network site via the telecommunications network;
(c) obtaining data for compressing the first data, the data for compressing for use in identifying one of a first data compression, and a second data compression;
wherein for the network data being indicative of a first result of the transmission characteristic, the data for compressing is for identifying the first data compression, and for the network data being indicative of a more constrained second result of the transmission characteristic, the data for compressing is for identifying the second data compression, wherein the first data compression compresses data less than the second data compression;
(d) enhancing the first data, or data derived therefrom, for obtaining enhanced data;
wherein the step of enhancing includes performing a first noise reduction resulting in the enhanced data having a first reduction in noise content when the data for compressing is for identifying the first data compression, and
wherein the step of enhancing includes performing a second noise reduction resulting in the enhanced data having a second reduction in noise content when the data for compressing is for identifying the second data compression;
wherein, for the first data including video data, the first noise reduction reduces more noise in the enhanced data than the second noise reduction;
(e) compressing the enhanced data with one of the first data compression and the second data compression according to the network data, thereby obtaining processed data;
(f) obtaining history information indicative of processing of the first data to obtain the process data, wherein the history information includes compression description information related to the data for compressing, and including enhancement description information indicative of enhancements performed on the first data for obtaining the enhanced data; and
(g) transmitting the processed data and the history information, via the network, to the network site;

wherein following the transmission, the transmitted history information is accessed for decompressing the transmitted processed data when the transmitted processed data is compressed.

In one embodiment, the image/video processing system disclosed herein can be characterized as a system for processing image or video data comprising:

an image or video recorder having the following (a) through (e):

(a) an image or video generator for generating image or video data;

(b) one or more enhancement processes for enhancing the image or video data, or a version derived therefrom resulting in enhanced data, wherein the enhancement processes include at least one noise reduction process;

(c) a compressor for compressing the enhanced data resulting in recorder processed data;

(d) an evaluator for determining whether (i) network data, related to a transmission characteristic for a network in operable communication with the recorder, is indicative of (ii) a first specification of the transmission characteristic, or a second specification of the transmission characteristic;

wherein the first specification is indicative of more constrained operational condition for performing a transmission on the network;

wherein the first specification corresponds to a first data compression, and the second specification corresponds to a second data compression;

wherein the first data compression compresses data less than the second data compression;

wherein prior to the first data compression being performed on the enhanced data, a first noise reduction is performed by the at least one noise reduction process for obtaining the enhanced data having a first reduction in noise content, and wherein prior to the second data compression being performed on the enhanced data, a second noise reduction is performed by the at least one noise reduction process for obtaining the enhanced data having a second reduction in noise content;

wherein the first noise reduction and the second noise reduction reduce different amounts of noise;

wherein history information indicative of processing of the image or video data to yield the recorder processed data is obtained, wherein the history information includes compression description information related to which of the first and second data compressions were performed, and including enhancement description information indicative of the enhancement processes performed to obtain the enhanced data; and (e) an interface to the network for transmitting the recorder processed data and the history information, via the network, to a predetermined network site;

wherein following the network transmission, the transmitted history information is accessed for decompressing the transmitted recorder processed data.

Further description of the advantages, benefits and patentable aspects of the present disclosure will become evident from the description hereinbelow and the accompanying drawings. All novel aspects of the disclosure, whether mentioned explicitly in this Summary section or otherwise (e.g., hereinbelow), are considered subject matter for patent protection either singly or in combination with other aspects of this disclosure. Accordingly, such novel aspects disclosed hereinbelow and/or in the drawings that may be omitted from, or less than fully described in, this Summary section are fully incorporated herein by reference into this Summary. In particular, all claims of the Claims section hereinbelow are fully incorporated herein by reference into this Summary section.

DETAILED DESCRIPTION

Introductory Remarks

Figure 1:
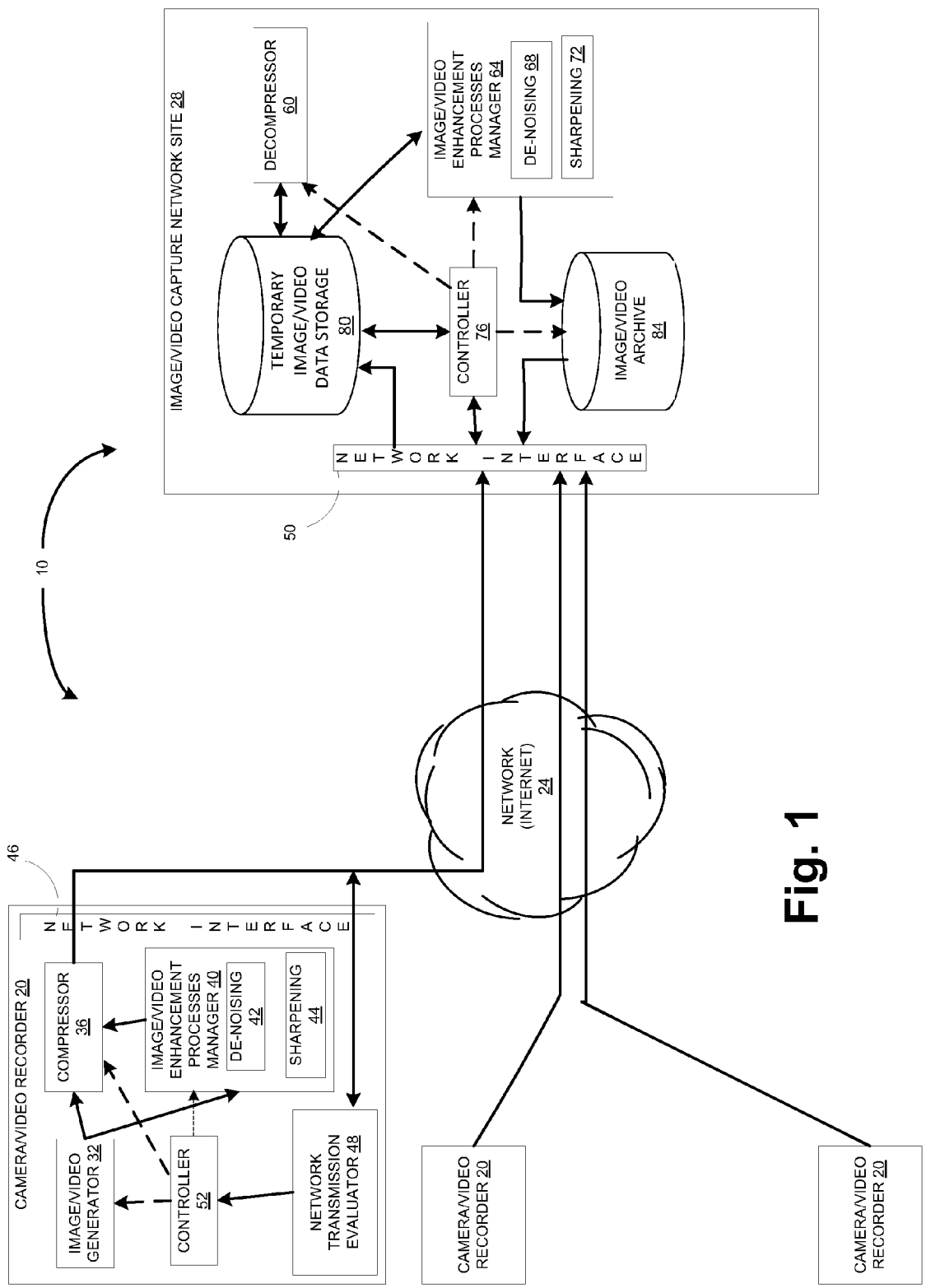
FIG. 1 is a block diagram showing the high level computational components of an embodiment of the distributed image/video processing system 10 disclosed herein.

For the purposes of promoting an understanding of the principles set forth in the present disclosure, reference will now be made to exemplary embodiments. Any alterations and further modifications of the inventive features illustrated herein, and any additional applications of the principles illustrated herein, which would occur to one skilled in the relevant art and having possession of this disclosure, are to be considered within the scope of the invention as described in the claims following this Detailed Description section. The features, functions, and the like described herein are considered to be able to be combined in whole or in part one with another as the claims and/or art may direct, either directly or indirectly, implicitly or explicitly.

Reference throughout this specification to an "embodiment," an "example" or similar language means that a particular feature, structure, characteristic, or combinations thereof described herein may, but do not necessarily, refer to the same embodiment, to different embodiments, or to embodiments disclosed in one or more of the figures.

Many of the functional units described in this specification may be labeled or identified as modules or computational components, in order to more particularly emphasize their implementation independence. For example, a module may be implemented as a combination of hardware and corresponding software substantially independently from other such modules or computational components.

Modules or computational components (e.g., computational machines, equipment, devices, etc.), such as those identified by boxes in FIG. 1 described hereinbelow, may comprise one or more physical or logical blocks of computer instructions which may, for instance, be organized as an object, procedure, or function. Nevertheless, the executable versions of such modules or computational components need not be physically located together (unless stated or implied otherwise), but may comprise disparate instructions stored in different locations which, when joined logically together, comprise higher level modules or computational components for achieving a particular stated purpose.

Moreover, a module, computational component and/or a program of executable code may be a single instruction, or many instructions, and may even be distributed over several different code segments, among different programs, and across several non-transitory memory devices. Similarly, operational data may be identified and illustrated herein for such modules or computational components, and may be embodied in any suitable form and organized within any suitable type of data structure. Such operational data may be collected as a single data set, or may be distributed over different locations including over different non-transient storage devices, and may exist, temporarily, merely as electronic signals on a system or network.

The various computational components and/or modules discussed herein may include one or more of a communications network host server or other computing systems which may include: (i) a machine processor for processing digital data; (ii) a non-transitory memory coupled to the processor for storing digital data; an input digitizer coupled to the processor for inputting digital data; (iii) an application program stored in the memory and accessible by the processor for directing processing of digital data by the processor; (iv) a display device coupled to the processor and memory for displaying information derived from digital data processed by the processor; and (v) a plurality of databases including corresponding database management systems. As those skilled in the art will appreciate, any computers or computational machinery discussed herein may include an operating system (e.g., Windows 7, Windows Vista, NT, 95/98/2000, OS2; UNIX; Linux; Solaris; MacOS, Snow Leopard; etc.) as well as various conventional support software and drivers typically associated with computers and/or a network of computers. The computers or computational machinery may be in a home, a business environment with access to the network, or such machinery may be mobile such as a mobile phone or other transportable telecommunications device. In an exemplary embodiment, access is through the Internet through a commercially-available web-browser software package.

The present disclosure may be described herein in terms of functional block components, screen shots, user interaction, optional selections, various processing steps, and the like. It should be appreciated that such functional blocks may be realized by any number of hardware and/or software components configured to perform the specified functions. Accordingly, embodiments disclosed herein may employ various integrated circuit components, e.g., memory elements, processing elements, logic elements, look-up tables, and the like, which may carry out a variety of functions under the control of one or more microprocessors or other control devices. Similarly, the software elements of the present disclosure may be implemented with any programming or scripting language such as C, C++, Java, COBOL, assembler, PERL, Visual Basic, SQL Stored Procedures, AJAX, extensible markup language (XML), and/or SOAP, with the various algorithms being implemented with any combination of data structures, objects, processes, routines or other programming elements. Further, it should be noted that the present disclosure may employ any number of conventional techniques for data transmission, signaling, data processing, network control, and the like. Still further, embodiments of the invention claimed herein may detect or prevent breaches in security with a client-side or host-side scripting language, such as JavaScript, VBScript or the like.

Additionally, many of the functional units and/or modules herein may be described as being "in communication" or "in operable communication" (or variations of such phrases) with other functional units and/or modules. Being "in communication" or "in operable communication" (or variations thereof) refers to any manner and/or way in which functional units and/or modules, such as, but not limited to, computers, laptop computers, PDAs, modules, network servers, routers, gateways, and other types of hardware and/or software, may be in communication with each other. Some non-limiting examples include: (i) activating or invoking another such functional unit or module, and (ii) sending, and/or receiving data or metadata via: a network, a wireless network, software, instructions, circuitry, phone lines, Internet lines, satellite signals, electric signals, optical signals, electrical and magnetic fields and/or pulses, and/or so forth.

Unless stated or clearly implied otherwise, network communication in accordance with the present disclosure may be accomplished through any suitable communication channels, such as, for example, a telephone network, an extranet, an intranet, Internet, point of interaction device (point of sale device, personal digital assistant, cellular phone, kiosk, etc.), online network communications, wireless communications, local area network (LAN), wide area network (WAN), networked or linked devices and/or the like. Moreover, although the network communications may be implemented with TCP/IP communications protocols, such communications may also be implemented using IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein. See, for example, DILIP, NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

For the computational instructions (e.g., software, scripts, firmware, etc.) and/or associated data disclosed or required due to the functional units or modules described herein, it is within the scope of the present disclosure to explicitly include storage media for storing such instructions and/or data utilized in enabling the system(s) and method(s) disclosed herein. For example, such storage media may be: computer readable magnetic disks or tape, optical disks, and other non-volatile or non-transient transportable memory (e.g., USB memory sticks, etc.).

As used herein, "comprising," "including," "containing," "is," "are," "characterized by," and grammatical equivalents thereof are inclusive or open-ended terms that do not exclude additional unrecited elements or method steps unless explicitly stated otherwise. "Comprising" is to be interpreted as including the more restrictive terms "consisting of" and "consisting essentially of."

Description of the Figures and Operation of the Distributed Image/Video Processing System.

FIG. 1 shows a distributed image/video processing system 10 which includes a plurality of camera/video recorders 20 operatively connected to a communications network 24 (e.g., the Internet) for transmitting image/video related data to the image/video capture site 28. Each of the camera/video recorders 20 may be one a substantially single purpose device such as a standalone camera or video recorder, or may be a multi-purpose device which includes a mobile (wireless) phone such as a smart phone, a computer laptop/tablet, or other computational networked communications device (e.g., a special purpose wireless communications device for transmitting images from a robot). Moreover, the camera/video recorders 20 are typically generate, store and process images/videos as digital data as one skilled in the art will understand. Instead of the network 24 being the Internet, other communications networks are also within the scope of the present disclosure such as local area (wireless) networks (as, e.g., provided in hospitals and institutions of higher education) or private wide area virtual networks. The image/video capture network site 28 may be an Internet website or any other network site accessible and known to the camera/video recorders 20.

A representative high level internal structure of each of the camera/video recorders 20 is shown by the upper left-hand camera/video recorder 20 of FIG. 1. In particular, each such recorder 20 includes an image/video generator 32 that, e.g., generates digital image data corresponding to a scene whose image(s) are captured. Such a generator 32 may be charge coupled device, a digital camera or video recorder, or CMOS sensors, cell phones, PC cameras, CMOS cameras and tablet cameras. Each of the camera/video recorders 20 further include a compressor 36 that can be used to compress such digital image data by the generator 32. There are a large number of image data compression techniques that may be embodied within the compressor 36, including both lossy and lossless data compression techniques. The following data compression techniques are representative as one of skill in the art will understand:

For Digital Images (Photos):

Cartesian Perceptual Compression: Also known as CPC, is a proprietary image file format. It was designed for high compression of black-and-white raster Document Imaging for archival scans.

DjVu: This is a computer file format designed primarily to store scanned documents, especially those containing a combination of text, line drawings, and photographs. It uses technologies such as image layer separation of text and background/images, progressive loading, arithmetic coding, and lossy compression for bitonal (monochrome) images. This allows for high-quality, readable images to be stored in a minimum of space, so that they can be made available on the web.

Fractal compression: This is a lossy compression method for digital images, based on fractals. The method is best suited for textures and natural images, relying on the fact that parts of an image often resemble other parts of the same image. Fractal algorithms convert these parts into mathematical data called "fractal codes" which are used to recreate the encoded image.

HAM: This is a hardware compression of color information used in Amiga computers, ICER: This is compression method is used by the Mars Rovers: related to JPEG 2000 in its use of wavelets, JPEG: In computing, JPEG is a commonly used method of lossy compression for digital photography (image). The degree of compression can be adjusted, allowing a selectable tradeoff between storage size and image quality. JPEG typically achieves 10:1 compression with little perceptible loss in image quality. JPEG compression is used in a number of image file formats. JPEG/Exif is the most common image format used by digital cameras and other photographic image capture devices; along with JPEG/JFIF, it is the most common format for storing and transmitting photographic images on the World Wide Web. These format variations are often not distinguished, and are simply called JPEG.

JPEG 2000: This is an image compression standard and coding system. It was created by the Joint Photographic Experts Group committee in 2000 with the intention of superseding their original discrete cosine transform-based JPEG standard (created in 1992) with a newly designed, wavelet-based method. JPEG 2000's format can be used for both lossy or lossless compression, JBIG2: This is an image compression standard for bi-level images, developed by the Joint Bi-level Image Experts Group. It is suitable for both lossless and lossy compression.

PGF (Progressive Graphics File): This compression method can be lossless or lossy. PGF is a wavelet-based bitmapped image format that employs lossless and lossy data compression. PGF was created to improve upon and replace the JPEG format.

Wavelet compression: This is a form of data compression well suited for image compression (sometimes also video compression and audio compression). Notable implementations are JPEG 2000 and ECW for still images, and REDCODE, the BBC's Dirac, and Ogg Tarkin for video. The goal is to store image data in as little space as possible in a file. Wavelet compression can be either lossless or lossy.

S3 Texture Compression (S3TC) (sometimes also called DXTn or DXTC): This is a group of related lossy texture compression algorithms originally developed by Iourcha et al. of S3 Graphics, Ltd.[1] for use in their Savage 3D computer graphics accelerator. The method of compression is strikingly similar to the previously published Color Cell Compression,[2] which is in turn an adaptation of Block Truncation Coding published in the late 1970s. Unlike some image compression algorithms (e.g. JPEG), S3TC's fixed-rate data compression coupled with the single memory access (cf. Color Cell Compression and some VQ-based schemes) made it ideally suited for use in compressing textures in hardware accelerated 3D computer graphics. Its subsequent inclusion in Microsoft's DirectX 6.0 and OpenGL 1.3 (GL_ARB_texture_compression) led to widespread adoption of the technology among hardware and software makers. While S3 Graphics is no longer a leading competitor in the graphics accelerator market, license fees are still levied and collected for the use of S3TC technology, for example in game consoles and graphics cards. The inclusion of patented technology within OpenGL and its wide usage in software have led to a requirement for the driver to support it and present a major block within open source AMD and Intel driver stack on Linux.

For Video Data:

DV: DV is an intraframe video compression scheme, which uses the discrete cosine transform (DCT) to compress video on a frame-by-frame basis. Audio is stored uncompressed.

H.263: This is a video compression standard originally designed as a low-bitrate compressed format for videoconferencing. It was developed by the ITU-T Video Coding Experts Group (VCEG) in a project ending in 1995/1996 as one member of the H.26x family of video coding standards in the domain of the ITU-T.

H.263 has since found many applications on the internet: much Flash Video content (as used on sites such as YouTube, Google Video, MySpace, etc.) used to be encoded in Sorenson Spark format (an incomplete implementation of H.263[1][2][3]), though many sites now use VP6 or H.264 encoding. The original version of the RealVideo codec was based on H.263 up until the release of RealVideo 8.

H.263 is a required video codec in ETSI 3GPP technical specifications for IP Multimedia Subsystem (IMS), Multimedia Messaging Service (MMS) and Transparent end-to-end Packet-switched Streaming Service (PSS). In 3GPP specifications, H.263 video is usually used in 3GP container format.

The codec was first designed to be utilized in H.324 based systems (PSTN and other circuit-switched network videoconferencing and videotelephony), but has since also found use in H.323 (RTP/IP-based videoconferencing), H.320 (ISDN-based videoconferencing), RTSP (streaming media) and SIP (Internet conferencing) solutions.

H.263 was developed as an evolutionary improvement based on experience from H.261, the previous ITU-T standard for video compression, and the MPEG-1 and MPEG-2 standards. Its first version was completed in 1995 and provided a suitable replacement for H.261 at all bitrates. It was further enhanced in projects known as H.263v2 (also known as H.263+ or H.263 1998), MPEG-4 Part 2 and H.263v3 (also known as H.263++ or H.263 2000). MPEG-4 Part 2 is H.263 compatible in the sense that a basic H.263 bitstream is correctly decoded by an MPEG-4 Video decoder.

The next enhanced codec developed by ITU-T VCEG (in partnership with MPEG) after H.263 is the H.264 standard, also known as AVC and MPEG-4 part 10. As H.264 provides a significant improvement in capability beyond H.263, the H.263 standard is now considered a legacy design. Most new videoconferencing products now include H.264 as well as H.263 and H.261 capabilities.

H.264/MPEG-4 Part 10 or AVC (Advanced Video Coding): This is a standard for video compression, and is currently one of the most commonly used formats for the recording, compression, and distribution of high definition video. The final drafting work on the first version of the standard was completed in May 2003.

H.264/MPEG-4 AVC is a block-oriented motion-compensation-based codec standard developed by the ITU-T Video Coding Experts Group (VCEG) together with the International Organization for Standardization (ISO)/International Electrotechnical Commission (IEC) Moving Picture Experts Group (MPEG). It was the product of a partnership effort known as the Joint Video Team (JVT). The ITU-T H.264 standard and the ISO/IEC MPEG-4 AVC standard (formally, ISO/IEC 14496-10-MPEG-4 Part 10, Advanced Video Coding) are jointly maintained so that they have identical technical content.

H.264 is perhaps best known as being one of the codec standards for Blu-ray Discs; all Blu-ray Disc players must be able to decode H.264. It is also widely used by streaming internet sources, such as videos from Vimeo, YouTube, and the iTunes Store, web software such as the Adobe Flash Player and Microsoft Silverlight, broadcast services for DVB and SBTVD, direct-broadcast satellite television services, cable television services, and real-time videoconferencing.

Motion JPEG (variations thereof): This is a compression method that uses a lossy form of intraframe compression based on the discrete cosine transform (DCT). This mathematical operation converts each frame/field of the video source from the time domain into the frequency domain (aka transform domain.) A perceptual model based loosely on the human psychovisual system discards high-frequency information, i.e. sharp transitions in intensity, and color hue. In the transform domain, the process of reducing information is called quantization. In laymen's terms, quantization is a method for optimally reducing a large number scale (with different occurrences of each number) into a smaller one, and the transform-domain is a convenient representation of the image because the high-frequency coefficients, which contribute less to the over picture than other coefficients, are characteristically small-values with high compressibility. The quantized coefficients are then sequenced and losslessly packed into the output bitstream. Nearly all software implementations of M-JPEG permit user control over the compression-ratio (as well as other optional parameters), allowing the user to trade off picture-quality for smaller file size. In embedded applications (such as miniDV, which uses a similar DCT-compression scheme), the parameters are pre-selected and fixed for the application.

M-JPEG is an intraframe-only compression scheme (compared with the more computationally intensive technique of interframe prediction). Whereas modern interframe video formats, such as MPEG1, MPEG2 and H.264/MPEG-4 AVC, achieve real-world compression-ratios of 1:50 or better, M-JPEG's lack of interframe prediction limits its efficiency to 1:20 or lower, depending on the tolerance to spatial artifacting in the compressed output. Because frames are compressed independently of one another, M-JPEG imposes lower processing and memory requirements on hardware devices.

As a purely intraframe compression scheme, the image-quality of M-JPEG is directly a function of each video frame's static (spatial) complexity. Frames with large smooth-transitions or monotone surfaces compress well, and are more likely to hold their original detail with few visible compression artifacts. Frames exhibiting complex textures, fine curves and lines (such as writing on a newspaper) are prone to exhibit DCT-artifacts such as ringing, smudging, and macroblocking. M-JPEG compressed-video is also insensitive to motion-complexity, i.e. variation over time. It is neither hindered by highly random motion (such as the surface-water turbulence in a large waterfall), nor helped by the absence of motion (such as static landscape shot by tripod), which are two opposite extremes commonly used to test interframe video-formats.

For QuickTime formats, Apple has defined two types of coding: MJPEG-A and MJPEG-B. MJPEG-B no longer retains valid JPEG Interchange Files within it; hence it is not possible to take a frame into a JPEG file without slightly modifying the headers.

Ogg Theora: This is a free, open container format maintained by the Xiph.Org Foundation. Ogg is designed to provide for efficient streaming and manipulation of high quality digital multimedia.

The Ogg container format can multiplex a number of independent streams for audio, video, text (such as subtitles), and metadata.

In the Ogg multimedia framework, Theora provides a lossy video layer. The audio layer is most commonly provided by the music-oriented Vorbis format but other options include the human speech compression codec Speex, the lossless audio compression codec FLAC, and OggPCM.

Dirac: Dirac employs wavelet compression, instead of the discrete cosine transforms used in older compression formats. Dirac applies wavelets to video compression.

VC-1: This is the informal name of the SMPTE 421M video codec standard, which was initially developed as a proprietary video format by Microsoft before it was released as a formal SMPTE standard video format on Apr. 3, 2006. It is today a widely supported standard found in HD DVDs, Blu-ray Discs, Windows Media, Slingbox, and Microsoft's Silverlight framework.

Note that it is within the scope of the present disclosure for the compressor 36 to include and utilize a plurality of digital image/video data compression techniques.

The camera/video recorder 20 also includes various image/video enhancement processes which are activated/controlled as appropriate by a manager 40. The image/video enhancement processes manager 40 for managing the enhancement of the digital image/video data obtained from the generator 32 as one skilled in the art will understand. For example, the image/video enhancement processes manager 40 manages the processing that can be performed by various de-noising techniques (shown as de-noising 42 processes in FIG. 1) may be used to reduce what is determined as noise in the image/video data. Such as:

Salt and pepper noise (sparse light and dark disturbances), wherein pixels in the image/video are very different in color or intensity from their surrounding pixels; the defining characteristic is that the value of a noisy pixel bears no relation to the color of surrounding pixels. Generally this type of noise will only affect a small number of image pixels. When viewed, the image contains dark and white dots, hence the term salt and pepper noise. Typical sources include flecks of dust inside the camera and overheated or faulty CCD elements.

Gaussian noise, wherein pixels in the image/video may be changed from their original values by (usually) small amounts. In Gaussian noise, it is assumed that the amount of distortion of a pixel value plotted against the frequency, with which it occurs, shows a normal distribution of noise.

Note that the noise at different pixels can be either correlated or uncorrelated; in many cases, noise values at different pixels are modeled as being independent and identically distributed, and hence uncorrelated.

Additionally, various sharpening and unsharp masking techniques (shown as sharpening 44 processes in FIG. 1) may be managed (e.g., activated as appropriate) by the image/video enhancement processes manager 40 as one skilled in the art will understand. Such sharpening and de-noising techniques are discussed hereinbelow. Additional enhancements include, e.g., white balancing as one skilled in the art will understand.

The camera/video recorder 20 also includes a network interface 46 for communicating with various sites on the network 24, such as the image/video capture network site 28. Additionally, the camera/video recorder 20 includes a transmission evaluator 48 which determines data related to one or more network transmission characteristics (e.g., an available bandwidth) of the network 24 for transmitting image/video data to the image/video capture site 28. The network transmission evaluator 48 may determine such data related to available network bandwidth by receiving information for one or more network transmission characteristics, wherein such characteristics may be, e.g., a network transmission time delay indicative of time delays when communicating with one or more network sites, a network data rate indicative of one or more transmission data rates when communicating with one or more network sites, and a maximum transmission time delay threshold when communicating with predetermined network site (e.g., the site 28). In order to obtain such network transmission characteristics, various techniques may be used, including:

(i) Pinging the image/video capture site 28 and comparing, e.g., a running average of the time delay for pings with entries in a data table (not shown) that correlates such ping time delay information with a value indicative of available network 24 bandwidth available; in particular, such ping time delay is inversely related to the available network bandwidth; and/or (ii) Determining a data transmission rate of the network at the recorder 20 or requesting a data transmission rate measurement from the image/video capture site 28, wherein the greater the measured data transmission rate, the greater the network bandwidth available; and/or (iii) Requesting a maximum transmission delay time threshold from the network site 28, wherein this threshold is the maximum transmission time delay threshold that the site 28 will wait for digital image/video data to be received before timing out from an initial corresponding network contact by the recorder 20 for transmitting such data.

In an alternative/additional embodiment, the network transmission evaluator 48 may ping a plurality of different network 24 sites for determining the extent of network traffic and thereby deduce a value indicative of available network bandwidth. In another embodiment, the network transmission evaluator 48 may request a network traffic measurement from the image/video capture site 28, wherein such a measurement may be, e.g., correlated with the data rate being received by the network interface 50 of the image/video capture site 28, and/or one or more predetermined other network sites.

The camera/video recorder 20 further includes a controller 52 that determines how image/video data is processed at the camera/video recorder. In particular (and as described in more detail below with reference to FIG. 2), the controller determines the image/video processing performed at the camera/video recorder 20 on image/video data, wherein such processing is dependent on the current network 24 one or more transmission characteristics (e.g., available bandwidth) for transferring such image/video data to the image/video capture site 28. In particular, the controller 52 sets imaging/video parameters for capturing, processing and transmitting (via the network 24) a larger amount of such data (e.g., containing more information content) when there is at least a first threshold of network 24 bandwidth available, and progressively lesser amounts of the such data as estimates of network bandwidth reduce. In at least one embodiment, the controller 52 may select a compression technique, provided by the compressor 36, along with determining the image/video processing techniques to be performed that are compatible with the compression technique. For example, once the network transmission evaluator 48 has provided information related to the network bandwidth available to the controller 52, this controller may first determine a compression technique provided by the compressor 36. However, since certain image/video enhancing techniques are not compatible with certain compression techniques (as is further described hereinbelow), the controller 52 may also determine one or more image/video processing techniques to be performed prior to the data compression (by the determined compression technique) wherein such image/video processing techniques are compatible with the compression technique.

Referring to the image/video capture network site 28, in addition to the network interface 44, this site includes decompressor module 60 for decompressing compressed image/video data received from the camera/video recorders 20. The decompressor 60 includes one or more (in at least some embodiments, preferably a plurality of) complementary modules providing data decompression techniques to the compression techniques available and used at the camera/video recorders 20 as one skilled in the art will understand. The network site 28 also includes one or more (generally a plurality) of image/video enhancement processes (e.g., de-noising 68 and sharpening 72) as well as a manager 64 for managing the processes for enhancing the decompressed image/video data. For example, the manager 64 may sequentially activate the enhancement processes for, e.g., pipelining therebetween as determined by instructions received from the controller 76, and store the resulting enhanced image/video data in the image/video archive 84.

Examples of the enhancement processes resident on both the recorders 20 and the network site 28 are as follows:

(a) One or more de-noising (noise reduction) processes 42 and 68 for de-noising the decompressed data. De-noising is very helpful in making digital image/video data more homogenous (e.g., fewer pixels having extreme outlier values in comparison to surrounding pixels). For instance, de-noising removes high frequency pixel data (i.e., pixel data which is Light Defective Pixel-DN count (110-140) using a light grey chart (0.44 Neutral Macbeth). Dark Defecctive Pixel-DN count (0-10) using a dark black chart (1.5 Black Macbeth) that may or may not be desirable in the resulting image/video. Additionally, de-noising also provides correction for what is called in the art as "defect pixel correction" wherein such de-noising removes dead/weak/strong pixels that are simply bad due to the digital image/video data generation process (e.g., in the generator 32). Such de-noising processes may utilize various de-noising techniques some of which are described as follows.

Chroma and luminance noise separation:
  In real-world photographs, the highest spatial-frequency detail consists mostly of variations in brightness ("luminance detail") rather than variations in hue ("chroma detail"). Since any noise reduction algorithm should attempt to remove noise without sacrificing real detail from the scene photographed, one risks a greater loss of detail from luminance noise reduction than chroma noise reduction simply because most scenes have little high frequency chroma detail to begin with. In addition, most people find chroma noise in images more objectionable than luminance noise; the colored blobs are considered "digital-looking" and unnatural, compared to the grainy appearance of luminance noise that some compare to film grain. For these two reasons, most photographic noise reduction algorithms split the image detail into chroma and luminance components and apply more noise reduction to the former. Most dedicated noise-reduction computer software allows the user to control chroma and luminance noise reduction separately.

Linear smoothing filters:
  One method to remove noise is by convolving the original image with a mask that represents a low-pass filter or smoothing operation as one skilled in the art will understand. Such convolution brings the value of each pixel into closer harmony with the values of its neighbors. In general, a smoothing filter sets each pixel to the average value, or a weighted average, of itself and its nearby neighbors; a Gaussian filter is just one possible set of weights.
  Smoothing filters tend to blur an image, because pixel intensity values that are significantly higher or lower than the surrounding neighborhood "smear" across the area. Because of this blurring, linear filters are seldom used in practice for noise reduction; they are, however, often used as the basis for nonlinear noise reduction filters.

Anisotropic diffusion:
  Anisotropic diffusion is a method for removing noise which evolves the image/video under a smoothing partial differential equation similar to the heat equation which is called anisotropic diffusion. With a spatially constant diffusion coefficient, this is equivalent to the heat equation or linear Gaussian filtering, but with a diffusion coefficient designed to detect edges, the noise can be removed without blurring the edges of the image.

Nonlinear filters:

A median filter is an example of a non-linear filter and, if properly designed, is very good at preserving image detail. To run a median filter:
1. Consider each pixel in the image;
2. Sort the neighboring pixels into order based upon their intensities; and
3. Replace the original value of the pixel with the median value from the list.

A median filter is a rank-selection (RS) filter, a particularly harsh member of the family of rank-conditioned rank-selection (RCRS) filters; a much milder member of that family, for example one that selects the closest of the neighboring values when a pixel's value is external in its neighborhood, and leaves it unchanged otherwise, is sometimes preferred, especially in photographic applications.

Median and other RCRS filters are good at removing salt and pepper noise from an image, and also cause relatively little blurring of edges, and hence are often used in computer vision applications.

In selecting a noise reduction technique(s) 68 (also referred to as a "de-noising technique), several factors may be taken into account:

the available computer power and time available: a digital camera must apply noise reduction in a fraction of a second using a tiny onboard CPU, while a desktop computer has much more power and time whether sacrificing some actual image/video detail is acceptable if it allows more noise to be removed (how aggressively to decide whether variations in the image are noise or not)

the characteristics of the noise and the detail in the image/video, to better make those decisions.

(b) One or more sharpening and unsharp masking processes 44 and 72 for sharpening the decompressed data, wherein such processes may utilize various techniques some of which are now described.

Deconvolution:

In optics and imaging, the term "deconvolution" is specifically used to refer to the process of reversing the optical distortion that takes place in an optical microscope, electron microscope, telescope, or other imaging instrument, thus creating clearer images. It is usually done in the digital domain by a software algorithm, as part of a suite of microscope image processing techniques. Deconvolution is also practical to sharpen images that suffer from fast motion or jiggles during capturing.

The usual method is to assume that the optical path through the instrument is optically perfect, convolved with a point spread function (PSF), that is, a mathematical function that describes the distortion in terms of the pathway a theoretical point source of light (or other waves) takes through the instrument. Usually, such a point source contributes a small area of fuzziness to the final image. If this function can be determined, it is then a matter of computing its inverse or complementary function, and convolving the acquired image with that. The result is the original, undistorted image.

In practice, finding the true PSF is impossible, and usually an approximation of it is used, theoretically calculated or based on some experimental estimation by using known probes. Real optics may also have different PSFs at different focal and spatial locations, and the PSF may be non-linear. The accuracy of the approximation of the PSF will dictate the final result. Different algorithms can be employed to give better results, at the price of being more computationally intensive. Since the original convolution discards data, some algorithms use additional data acquired at nearby focal points to make up some of the lost information. Regularization in iterative algorithms (as in expectation-maximization algorithms) can be applied to avoid unrealistic solutions.

When the PSF is unknown, it may be possible to deduce it by systematically trying different possible PSFs and assessing whether the image has improved. This procedure is called blind deconvolution. Blind deconvolution is a well-established image restoration technique in astronomy, where the point nature of the objects photographed exposes the PSF thus making it more feasible. It is also used in fluorescence microscopy for image restoration, and in fluorescence spectral imaging for spectral separation of multiple unknown fluorophores. The most common iterative algorithm for the purpose is the Richardson-Lucy deconvolution algorithm; the Wiener deconvolution (and approximations thereof) is/are the most common non-iterative algorithms.

Digital Unsharp Masking:

Unsharp masking applies a Gaussian blur to a copy of the original image and then digitally compares it to the original. If the difference is greater than a user-specified threshold setting, the images are (in effect) subtracted. The threshold control constrains sharpening to image elements that differ from each other above a certain size threshold, so that sharpening of small image details, such as photographic grain, can be suppressed.

Digital unsharp masking is a flexible and powerful way to increase sharpness, especially in scanned images. However, it is easy to create unwanted and conspicuous edge effects, or increase image noise. On the other hand, these effects can be used creatively, especially if a single channel of an RGB or Lab image is sharpened. Undesired effects can be reduced by using a mask—particularly one created by edge detection—to only apply sharpening to desired regions, sometimes termed "smart sharpen".

Typically three settings (known as "amount", "radius", and "threshold") control digital unsharp masking:

Amount is listed as a percentage, and controls the magnitude of each overshoot (how much darker and how much lighter the edge borders become).

This can also be thought of as how much contrast is added at the edges. It does not affect the width of the edge rims.

Radius affects the size of the edges to be enhanced or how wide the edge rims become, so a smaller radius enhances smaller-scale detail. Higher Radius values can cause halos at the edges, a detectable faint light rim around objects. Fine detail needs a smaller Radius. Radius and Amount interact; reducing one allows more of the other.

Threshold controls the minimum brightness change that will be sharpened or how far apart adjacent tonal values have to be before the filter does anything. This lack of action is important to prevent smooth areas from becoming speckled. The threshold setting can be used to sharpen more-pronounced edges, while leaving subtler edges untouched. Low values should sharpen more because fewer areas are excluded. Higher threshold values exclude areas of lower contrast.

Various recommendations exist as to good starting values for these parameters.

Generally a radius of 0.5 to 2 pixels and an amount of 50-150% is a reasonable start.

As with the camera/video recorder 20, the image/video capture network site 28 also includes a controller (76) for controlling the processing of the image/video data (compressed, enhanced and/or other techniques) from one of the plurality of camera/video recorders 20. In particular, the controller 76 controls the processing of such image/video data so that it is appropriately decompressed (as necessary by the decompressor 60) and appropriately enhanced (as necessary by the image/video enhancement processes manager 64). Additionally, the site 28 may also include a temporary (non-transient) image/video data storage 80 for temporary storage prior to processing. Note that for each transmission of image/video data (whether compressed, enhanced or otherwise), such data is associated in the data storage 80 with: (i) such data's corresponding processing history data also transmitted to the site 28, and (ii) an identifier identifying the owner or user of the camera/video recorder 20 from which the original image/video data was generated. Thus, for each transmission of image/video data, the controller 76 may retrieve from the data storage 80 the corresponding processing history data for determining, e.g., how to decompress the image/video data, and how to enhance the image/video data. In directing such processing, the controller 76 may examine a quality field and/or one or more instruction fields in the corresponding processing history data for determining what enhancement to the image/video data are to be performed. Subsequently, once an instance of the image/video data is fully processed, the resulting image/video data is stored in the image/video archive 84, wherein it may be, e.g., retrieved and displayed by the corresponding user whose identity is associated with the instance.

System Operation.

In the description hereinbelow, various terms are bolded and italicized to identify such terms as being more fully described/defined in Appendix provided hereinbelow.

During operation, when digital image/video data is generated by the generator 32, the controller 52 determines (prior to transmitting such digital image/video data to the image/video capture site 28): (i) the image/video enhancement processes 40 (if any) to apply to the digital image data, and (ii) how such data (if any) is subsequently processed by the compressor 36 after the enhancement processes are applied. In particular, upon the controller 52 receiving, from the network transmission evaluator 48, data indicative of the (current) network 24 bandwidth available for transmission of the digital image data (or a compressed and/or enhanced version thereof), this controller determines the image/video enhancement processes such as a de-noising process 42 or a sharpening process 44 to activate (descriptions of such enhancement processes being described hereinabove). Thus, the greater network bandwidth available, the less compression is applied, and as the available network bandwidth reduces, the more data compression may be applied to the digital image/video data (or an enhanced version thereof). Moreover, as discussed hereinabove, the data compression technique and the image/video enhancement processes may be selected/determined by the controller 52 so that they are compatible with one another, e.g., in the sense that the resulting compressed data will provide an appropriate image/video presentation once processed at the network site 28 (for example, it is undesirable for the final image/video to have blank scenes therein such as "green screens" as one skilled in the art will understand).

Subsequently, upon the image/video capture network site 28 receiving (at the network interface 50) the compressed image/video data from the camera/video recorder 20, this network interface notifies the controller 76 so that the controller 76 can provide instructions for processing the data in consideration of the corresponding processing history data.

In general for video data, if the network 24 bandwidth available is high (e.g., "High Bandwidth" in Tables 1B and 1C below for video data), it may be preferable to perform: (i) Aggressive de-noising, and (ii) correspondingly Little/no Compression. This is due to the fact that de-noising and compression techniques are many times performing similar functions when it comes to the removal of high frequency pixel data in video data. For example, inter-frame blocked based compression algorithms like MPEG (and variations thereof, e.g., MPEG1, MPEG2 and MPEG4), H.264, VC-1, Flash, etc.) remove high frequency pixel data to achieve more compression as one skilled in the art will understand. Additionally, de-noising generally also removes such high frequency pixel data thereby making videos more homogenous as described hereinabove. Thus, if de-noised data is provided to such inter-frame blocked based compression algorithms, such algorithms may likely remove the next highest pixel frequency data. In some cases, the resulting video may be appear washed out, or blank with no picture at all in the worst-case. Thus, when Little/no Compression is applied to video data (e.g., when there is high available network 24 bandwidth), Aggressive de-noising may be preferable for at least the removal of high frequency pixel data.

However, when the network 24 available bandwidth is low (e.g., "Low Bandwidth" in Tables 1B and 1C below for video data), and a potentially high compression process (of the compressor 36) is activated to perform Aggressive Compression (or Extremely Aggressive Compression), then since such compression will both highly compress the video data and also remove high frequency pixel data, Little/no de-noising is preferable prior to compression thus leaving noise (and high frequency pixel data) in the video data.

Regarding sharpening, if Aggressive sharpening is performed on an image/video, high frequency pixel data may likely be created. Such high frequency pixel data is beneficial when the aggressively sharpened video data is subsequently compressed by, e.g., an inter-frame block based algorithm since such an algorithm will remove the high frequency pixel data. In particular, the sharpening and compression processes effectively cancel out one another in this regard, but the result also has a reduced image/video data size. Accordingly, sharpening and compression may be directly related with one another in the recorder 20, and it may be necessary for the controller 52 to take such interactions into account in determining the combination of data compression with image/video processing techniques. Thus, in at least some cases, sharpening of digital image/video data may be based on a selected compression technique to be used. Alternatively, the compression technique may be based on a selected sharpening technique to be used.

For instance, for the M-JPEG compression technique, an overly sharp image (i.e., an image is "overly sharp" when ringing occurs as indicated hereinabove) may be problematic since such ringing may not be removed by this compression technique, even when Aggressive Compression or Extremely Aggressive Compression is performed. However, for H.264/MPEG4/VC-1 compression techniques, an overly sharp image may be preferred when Aggressive Compression or Extremely Aggressive Compression is performed since high frequency pixels are removed by such aggressive compression techniques.

In various embodiments, when the network 24 available bandwidth is above, e.g., 536 Kbps (kilo bits per second, "High Bandwidth" in Table 1A below) for images and 50,000 Kbps ("High Bandwidth" in Table 1C below) for video, Little/no Compression of the digital image/video data may be performed prior to network 24 transmission, and Little/no sharpening may be performed at the camera/video recorder 20. However, for less network 24 available bandwidth, more compression is performed (e.g., Moderate Compression or Aggressive Compression), and (i) more de-noising is performed for image (photo) data and (ii) less de-noising is performed for video data. Additionally, as available network bandwidth reduces, fewer other enhancement processes such as sharpening and white balance are performed regardless of whether video or image data is generated at the recorder 20.

TABLES 1A through 1F hereinbelow show representative ranges or extents for available network bandwidth (in the leftmost two columns), and for each such range or extent, it's table row shows the corresponding compression, de-noising and sharpening that may be performed at the recorder 20 prior to transmission of the recorder processed image/video data to the network site 28. Note that the bandwidth ranges or extents in the leftmost two columns of TABLES 1A-1F are representative of one or more of (a) a network pinging value(s), or a network data transmission rate(s) as described hereinabove in describing the transmission evaluator 48, and/or (b) a maximum time for image/video data transfer to a network subsystem (e.g., a website). Regarding such a maximum time for data transfer, in one embodiment, the longer this maximum time, the less presumed network 24 available bandwidth is available. Accordingly, such maximum delay time and available network may be inversely related. Thus, in determining what image/video processing is performed at the recorder 20, a current (or most recently obtained) measurement of the available network 24 bandwidth (or information indicative thereof) may be compared to various predetermined bandwidth related information (e.g., bandwidth ranges or extents, or maximum transmission time) known to the evaluator 48 (e.g., those of the leftmost column of the TABLES 1A-1F). For example, the evaluator 48 may determine which of the bandwidth ranges or extents (as provided in at least one of the two leftmost columns of TABLES 1A-1F hereinbelow) a current measurement of network 24 available bandwidth would be classified. Subsequently, the controller 52 may use such a classification of the measurement to determine the degree of data compression and image/video enhancement processes to perform as identified in the same row of TABLES 1A-1F that identifies the measurement's classification.

Note that there may also be a minimum time delay communicated to the recorder 20 as well. In particular, when the network 24 (or the network site 28) is experiencing an overload condition, such a minimum time delay may be communicated to the recorder 20 for purposely delaying a transmission of digital image/video data. When such a minimum time delay is provided to the recorder 20, the recorder 20 may perform additional image/video enhancement processes 64 prior to data compression via the compressor 36.

For image data (not video), the following TABLE 1A is representative, wherein there is a maximum network 24 transfer delay time of 60 seconds, and a pixel is 3 bytes (RGB) uncompressed.

TABLE 1A

| Bandwidth Description | Available Network Bandwidth Range | Compression | De-noising | Sharpening |
| --- | --- | --- | --- | --- |
| High Bandwidth | At or above 536 kilo bits/sec (kbps) | No compression (The image data may be approximately 4,000 KB (kilobytes).) | Little/no de-noising | Little/no sharpening. |
| Moderate Bandwidth | From below 536 kilo bits/sec (kbps) down to 402 kbps | Moderate compression via, e.g., for compressing the image data to approximately 3,000 KB (kilobytes). | Moderate de-noising | Moderate sharpening. |
| Moderate Bandwidth | From below 402 kbps down to 268 kbps | Moderate compression via, e.g., for compressing the image data to approximately 2,000 KB (kilobytes). | Moderate de-noising | Moderate sharpening. |
| Low Bandwidth | From below 268 kbps down to 134 kbps. | Aggressive compression via, e.g., for compressing the image data to approximately 1,000 KB (kilobytes). | Moderate de-noising | Aggressive sharpening. |
| Low Bandwidth | From below 134 kbps down to 67 kbps. | Aggressive compression via, e.g., for compressing the image data to approximately 1,000 KB (kilobytes). | Aggressive de-noising | Aggressive sharpening. |

For video data having 640×480 pixels per frame (compressed via MPEG-4/H.264/VC-1/Flash and other inter-frame blocked based compression algorithms), the following TABLE 1B is representative. Note that Internet video currently is generally transmitted at about 640×480 pixels per frame (VGA), but may extend to, e.g., 1920×1080 pixels per frame (1080P).

TABLE 1B

| Bandwidth Description | Available Network Bandwidth Range | Compression | De-noising | Sharpening |
|---|---|---|---|---|
| High Bandwidth | At or above 2,500 kilo bits/sec (kbps) | No compression | Aggressive de-noising | Little/No sharpening |
| Moderate Bandwidth | From below 2,500 kilo bits/sec (kbps) down to 1,500 kbps | Moderate compression. | Aggressive de-noising | Little/No sharpening |
| Moderate Bandwidth | From below 1,500 kbps down to 768 kbps | Moderate compression. | Moderate de-noising | Moderate sharpening |
| Moderate Bandwidth | From below 768 kbps down to 512 kbps | Aggressive compression. | Moderate de-noising | Moderate sharpening |
| Low Bandwidth | From below 512 kbps down to 256 kbps | Aggressive compression. | Moderate de-noising | Aggressive sharpening |
| Low Bandwidth | From below 256 kbps | Aggressive compression. | Little/None de-noising | Aggressive sharpening |

For M-JPEG video data having 640×480 pixels per frame and VGA images, the following TABLE 1C is representative.

TABLE 1C

| Bandwidth Description | Available Network Bandwidth Range | Compression | De-noising | Sharpening |
|---|---|---|---|---|
| High Bandwidth | At or above 50,000 kilo bits/sec (kbps) | No compression | Aggressive de-noising | Little/No sharpening |
| Moderate Bandwidth | From below 50,000 kbps down to 25,000 kbps | Moderate compression. | Aggressive de-noising | Little/No sharpening |
| Low Bandwidth | From below 25,000 kbps down to 10,000 kbps | Aggressive compression. | Aggressive de-noising | Moderate sharpening |
| Low Bandwidth | From below 10,000 kbps | Aggressive compression. | Moderate de-noising | Moderate sharpening |

For embodiments where a 5 Mega-Pixel image is output by the generator 32, and a corresponding image is to be transmitted over the Internet in 20 seconds, such that white balance is performed manually by the user, exposure is automatic (with limits, e.g., 1/15 second), and both focus and zoom can be any appropriate user desired values, the following Table 1D shows representative relationships between available bandwidth, compression, de-noising, and sharpening. Note, the numerical value "x" in each of the "Compression Factor" column cells means that the resulting data size is 1/x of the original size.

TABLE 1D

| Bandwidth Description | Available bandwidth (Kbps) | Image Size (Kb) | compression type | Time to Send (in seconds) | Compression Factor & Description | De-noising | Sharpening |
|---|---|---|---|---|---|---|---|
| High Bandwidth | 5000+ | 5000 | Loss Less | 20 | 2 (Little/no Compression) | Little/no de-noising | Little/no sharpening |
| Moderate Bandwidth | Less than 5000 and greater than 1500 | 5000 | Loss Less | 20 | 4 (Little/no Compression) | Moderate de-noising | Moderate sharpening |
| Moderate Bandwidth | Less than 1500 and greater than 768 | 5000 | JPEG | 20 | 8 (Little/no Compression) | Moderate de-noising | Moderate sharpening |
| Low Bandwidth | Less than 768 and greater than 320 | 5000 | JPEG | 20 | 19 (Moderate Compression) | Moderate de-noising | Aggressive sharpening |
| Low Bandwidth | Less than 320 and greater than 50 | 5000 | JPEG | 20 | 120 (Extremely Aggressive Compression) | Aggressive de-noising | Aggressive sharpening |

For embodiments where a 640×480 video is transmitted over the Internet in real time, such that white balance is performed manually by the user, exposure is automatic (with limits, e.g., 1/30 second), focus is off, and zoom is manual, the following Table 1E shows representative relationships between available bandwidth, compression, de-noising, and sharpening. Note, the numerical value "x" in each of the "Compression Factor" column cells means that the resulting data size is 1/x of the original size.

TABLE 1E

| Bandwidth Description | Available bandwidth (Kbps) | Image Size (Kb) | compression type | Compression Factor & Description | De-noising | Sharpening |
|---|---|---|---|---|---|---|
| High Bandwidth | 2500+ | 144000 | H.264 | 58 (Moderate Compression) | Aggressive de-noising | Little/no sharpening |
| Moderate Bandwidth | Less than 2500 and greater than 1500 | 144000 | H.264 | 96 (Moderate Compression) | Moderate de-noising | Moderate sharpening |
| Moderate Bandwidth | Less than 1500 and greater than 768 | 144000 | H.264 | 188 (Moderate Compression) | Moderate de-noising | Moderate sharpening |
| Low Bandwidth | Less than 768 and greater than 512 | 144000 | H.264 | 282 (Aggressive Compression) | Moderate de-noising | Aggressive sharpening |
| Low Bandwidth | Less than 512 and greater than 256 | 144000 | H.264 | 563 (Extremely Aggressive Compression) | Little/no de-noising | Aggressive sharpening |

For embodiments where a 720P video is transmitted over the Internet in real time, such that white balance is performed manually by the user, exposure is automatic (with limits, e.g., 1/60 second), focus is off, and zoom is manual, the following Table 1F shows representative relationships between available bandwidth, compression, de-noising, and sharpening. Note, the numerical value "x" in each of the "Compression Factor" column cells means that the resulting data size is 1/x of the original size.

TABLE 1F

| Bandwidth Description | Available bandwidth (Kbps) | Image Size (Kb) | compression type | Compression Factor & Description | De-noising | Sharpening |
|---|---|---|---|---|---|---|
| High Bandwidth | 100000+ | 864000 | M-JPEG | 9 (Little/no Compression) | Aggressive de-noising | Little/no sharpening |
| Moderate Bandwidth | Less than 100000 and greater than 50000 | 864000 | M-JPEG | 18 (Moderate Compression) | Aggressive de-noising | Moderate sharpening |
| Moderate Bandwidth | Less than 50000 and greater than 25000 | 864000 | M-JPEG | 35 (Moderate Compression) | Aggressive de-noising | Moderate sharpening |
| Low Bandwidth | Less than 25000 and greater than 10000 | 864000 | M-JPEG | 87 (Aggressive Compression) | Moderate de-noising | Moderate sharpening |

Figure 2:
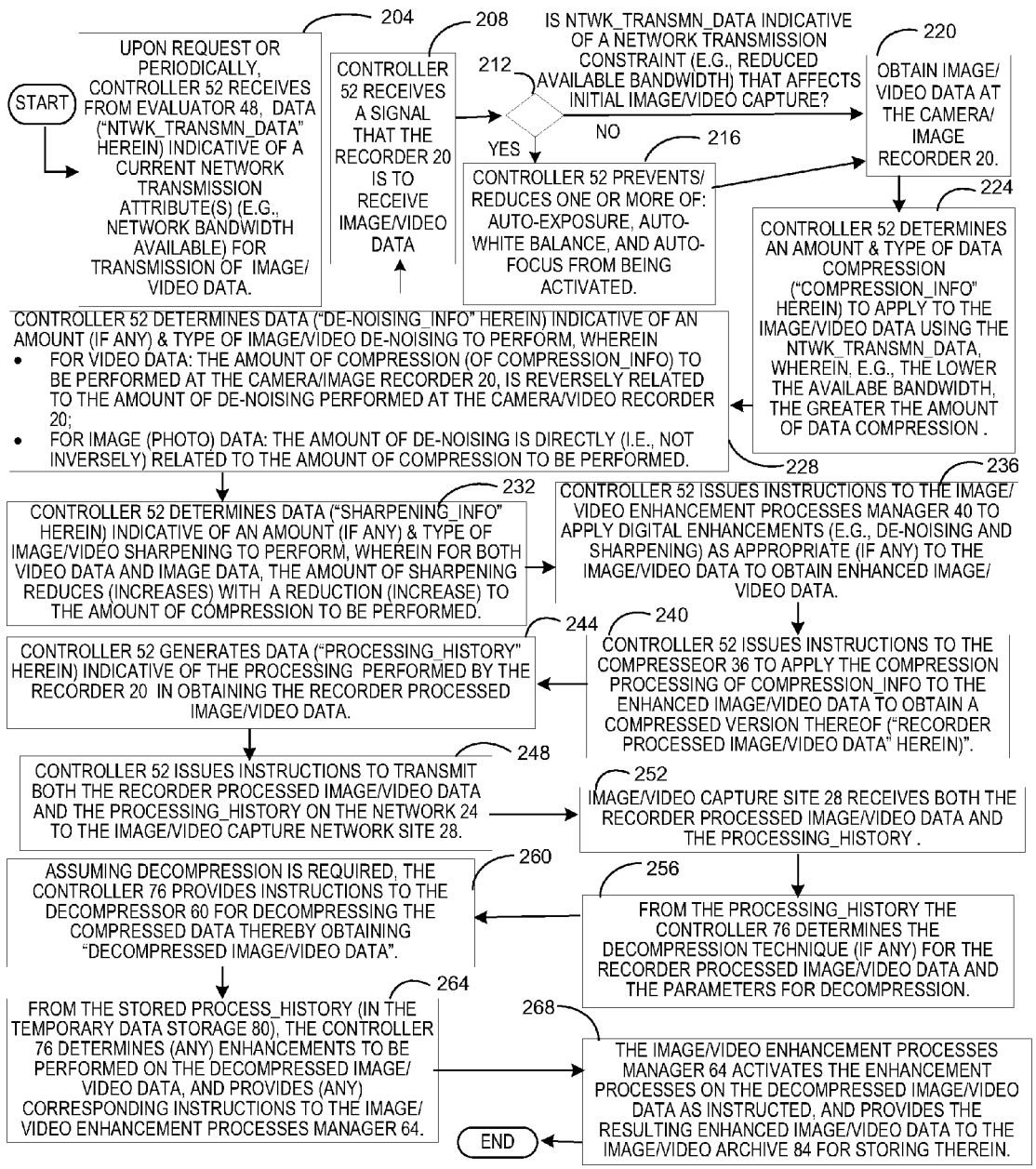
FIG. 2 is a flowchart illustrating an embodiment of the steps performed by the distributed image/video processing system 10 disclosed herein.

FIG. 2 shows a flowchart illustrating the high level steps performed by at least one embodiment of the image/video processing in capture system 10 of the present disclosure. In step 204, the controller 52 receives (upon request or periodically) data indicative of the currently available network 24 bandwidth (or one or more constraints on transmission of image/video data, e.g., a constraint such as a minimum transmission delay time). Accordingly, the term "network transmission data" is used hereinbelow (and abbreviated in FIG. 2 to "NTWK_TRANSMN_DATA") to denote such network or network site related transmission attributes (more particularly, constraints) that are used in influencing digital image/video data processing at a recorder 20 so that the network transmission of such, digital image/video data to a particular network site (28) is more effective. Accordingly, the controller 52 may maintain (in internal data storage, not shown) such network transmission data. In one embodiment, this data may include estimated available kilobytes per second that can be timely transmitted to the network site 28. Alternatively/additionally, such data may include a network 24 time delay for transmissions to the network site 28. Other possibilities include a designated time window for network transmission, or the like. In step 208, the controller 52 receives a signal or notification that the recorder 20 is about to receive image/video data (e.g., the user of the recorder activated the recorder for obtaining an image or a video). Note that when the controller 52 is notified (e.g., by such user input), the controller determines, in the case the network transmission data including available network bandwidth data, whether the most recently obtained measurement of the available network 24 bandwidth is, e.g., below or above at least one predetermined network bandwidth threshold. If the measurement is above such a threshold, then image/video enhancing processes, e.g., auto-exposure, auto-white balance, and auto-focus may be available for activation, e.g., during image/video initial capture by the recorder 20. Alternatively, if the measurement is below such a threshold, then one or more image/video enhancing processes such as auto-exposure, auto-white balance, and auto-focus may be prevented from being activated. In particular, in step 212, the controller 52 accesses, e.g., an internal data table (not shown, in FIG. 1), for determining whether network transmission data has been obtained that may affect image/video initial capture. For instance, this internal data table may include information indicating that the network 24 has a sufficiently currently reduced (or increased) available bandwidth to warrant changing the image/video processing performed by the recorder 20. Accordingly, if there is a reduction in network 24 available bandwidth (e.g., as per the bandwidth description and measurement range, of e.g., the last row of an applicable one of the Tables 1A through 1F hereinabove), then step 216 may be performed wherein, in one embodiment, the controller 52 determines and communicates to the generator 32 which image/video capabilities to reduce or entirely inhibit (e.g., auto-exposure, auto-white balance, auto-focus, etc.) in order to reduce the quantity of image/video data captured.

Whether step 216 is performed or not, in step 220, the image/video generator 32 generates and stores image/video data obtained from, e.g., a user operating the camera/video recorder 20. Note that in one embodiment, the camera/video recorder 20 may operate without requiring manual operation such as when such a recorder 20 is used for surveillance or monitoring. Further note that the generator 32 may include non-transient data storage (not shown in FIG. 1) for the generated image/video data. Alternatively, such non-transient data storage may be external to the generator 32 as one skilled in the art will understand.

Once the image/video data is obtained (e.g., stored in a non-transient data storage of the recorder 20), step 224 is performed wherein the controller 52 determines an amount (if any) and type of data compression to apply to the image/video data for reducing the quantity of data transmitted on the network 24 when delivering this image/video data (or a corresponding version thereof) to the image/video capture site 28. In particular, the image/video data is compressed a greater (lesser) amount when the available network 24 when a network constraint such as available network bandwidth is reduced (increased) as illustrated in Tables 1A through 1F hereinabove.

In at least one embodiment, in performing step 224 for image data, the evaluator 48 obtains or reads a first network 24 related parameter data indicative of a preferred size of the image data for transferring on the network 24. Since the size of the image output by the generator 32 is available to the recorder 20 (e.g., 5 MegaPixels as in Table 1D above), a compression factor can be computed (i.e., size of generator outputted image divided by preferred image size). Additionally/optionally, a second parameter data indicating the data compression type to perform may be provided via being read from a network 24 transmission (e.g., transmitted from the site 28), or, alternatively, the compression type may be determined by the recorder 20 (e.g., the recorder may determine an available compression type that provides the desired compression factor and is the least lossy). Given such a compression factor, and compression type (e.g., Loss Less, or JPEG), a table (such as Table 1D) resident at the recorder 20 can be accessed to determine corresponding enhancement processes (and parameters therefor) such as de-noising and sharpening processes to perform.

Note that similar determinations can be made for video data. For example, if the network 24 provides a preferred transmission data rate, then assuming the recorder 20 has access to the video data rate (e.g., Kbps) being output by the generator 32, a video compression factor can determined for corresponding transmissions on the network. Additionally, a compression type can be determined either from being read from a network 24 (or site 28) transmission, or, alternatively, the compression type may be determined by the recorder 20, wherein the recorder may determine an available compression type that provides the desired compression factor and is the least lossy.

Accordingly, assuming (i) the recorder 20 has access to one or more of the tables (or corresponding data structures) providing the information of, e.g., one or more of Tables 1D 1F (or similar tables for other image sizes and/or video network transmission data rates), and assuming (ii) the recorder 20 also has access to desired or preferred a image/video network transmission attributes (e.g., size or data rate), then such tables can be accessed by the recorder to determine at least the type of de-noising, sharpening, and compression processes to be applied, as well as the parameters for operably configuring each of these processes. Thus, even though much of the description herein and the flowchart of FIG. 2 is illustrative of such processes being dependent upon available network bandwidth, other known or unknown constraints/conditions (e.g., substantially unrelated to available network bandwidth) may be involved in determining the desired or preferred a image/video network transmission attributes.

Subsequently, in step 228, the controller 52 determines an amount or extent (if any) and type of de-noising to perform on the image/video data, wherein for image (e.g., photo) data, a greater amount of de-noising is performed when a greater amount of compression is to be performed on the image/video data, and wherein for video data, the amount or degree of de-noising is inversely related to the amount or degree of compression to be performed. Thus, e.g., for image data, a minimal amount of de-noising may be performed if the controller 52 determines that no or little data compression is to be performed.

Subsequently, in step 232, the controller 52 determines an amount or extent (if any) and type that the image/video data is to be sharpened, wherein the amount or extent of the sharpening is directly related to the amount or extent of compression of the image/video data. Thus, e.g., a minimal amount of sharpening may be performed if the controller 52 determines that a minimal amount data compression is to be performed on the image/video data.

In step 236, the controller 52 issues instructions to the image/video enhancement processes 40 for digitally enhancing the image/video data according to the determinations made in steps 228 and 232. In particular, the de-noising module 42 and/or sharpening module 44 may be activated to apply to the image/video data their respective processes according to the determinations made in steps 228 and 232. Note, that in one embodiment, the de-noising of the image/video data (if any) is first performed and the sharpening (if any) is performed on the image/video data output from the de-noising process. Additionally, in one embodiment of the recorder 20, one or more of the auto-exposure, auto-white balance, and auto-focus may also be image/video processing enhancement utilities provided in the enhancement processes 40, and may be similarly processed in the steps 232 and 236. For example, the controller 52 may determine an amount or extent to apply such utilities dependent upon the currently available network 40 bandwidth, wherein such utilities are applied inversely to the currently available network bandwidth.

In step, 240, assuming data compression is to be performed, the controller 52 issues instructions to the compressor 60 to compress the resulting version of the image/video data output from the image/video enhancement processes 40 according to the determinations in step 224 of "COMPRESSION_INFO" in FIG. 2. Note, in some contexts, no compression may be performed on the image/video data since there may be, e.g., sufficient network 24 bandwidth, transmission time, or a transmission window may be sufficiently wide to transmit the image/video data without compressing it. Additionally, in some contexts, if the network 24 bandwidth (transmission time, or a transmission window) is sufficiently reduced, none of the image/video enhancement processes 40 may be performed, and accordingly the compressor module 60 may receive the originally obtained image/video data. Note that the instructions from the controller 52 to the compressor 60 can indicate from where the compressor is to obtain its input as one skilled in the art will understand. The compressor 60 may output the compressed data to a predetermined data storage (not shown in FIG. 1) as one skilled in the art will understand.

In step 244, the controller 52 prepares a processing history of the processing that has been performed on original image/video data obtained at the recorder 20, wherein this history identifies the following:
(i) whether the image/video data has been compressed;
(ii) if the image/video data has been compressed, an identification of the compression technique used and the compression parameters used;
(iii) the image/video enhancement utilities applied to the image/video data and their corresponding parameters, including: (a) the type of de-noising applied (if any) and the parameters used, (b) the type of sharpening applied (if any) and the corresponding parameters used, (c) whether auto-exposure was performed and the (any) corresponding parameters therefor, (d) whether auto-white balance was performed and the (any) corresponding parameters therefor, and (e) whether auto-focus, manual focus and/or a zoom distance was performed and the (any) corresponding parameters therefor;
(iv) the image/video enhancement utilities that desirably or preferably should have been applied (e.g., under optimal network 24 bandwidth conditions of high available bandwidth such as a ping round trip delay of less than 0.5 seconds to the site 28).

Additionally, such history information may also include an identification of the recorder 20, and/or an identification of a user, subscriber, or owner of the recorder for, e.g., identifying who owns or has access to the corresponding image/video data stored on the network site 28 after any further image/video processing is performed and the result is stored in the image/video archive 84. Note that the history information may be output by the controller 52 to a predetermined data storage location prior to network transmission, such data storage not shown in FIG. 1.

For ease of description, the image/video data resulting from the steps hereinabove will be referred to as "recorder processed image/video data". Accordingly, in step 248, the controller 52 issues instructions for transmitting both the recorder processed image/video data and its corresponding history information to the image/video capture network site 28. Such instructions may be received by the network interface 46 for directing this interface to access the data storage for each of the recorder processed image/video data and its corresponding history information, and to transmit each to the network site 28. In particular, the history information may be transmitted within a bitstream that also transmits the recorder processed image/video data, or alternatively, the history information may be transmitted through a separate RTP/RTSP transmission as one skilled in the art will understand. In an alternative embodiment, the controller 52 may access both the stored recorder processed image/video data and its corresponding history information for inputting them to the network interface 46 together with a network 24 address for transmission to the site 28 (the address identifying this site).

Subsequently, in step 252, the network interface 50 of the image/video capture site 28 receives both the recorder processed image/video data and its corresponding history information transmitted from the camera/video recorder 20. Upon receiving and identifying each of the recorder processed image/video data and its corresponding history information, the network interface 50 may output them to the temporary image/video data storage 80, this storage being managed by a database management system such as a relational database management system as one skilled in the art will understand. Note that such a database management system may maintain various context values for identifying when both the recorder processed image/video data and its corresponding history information have been stored therein.

After the controller 76 is notified by the network interface 50 (or the above database management system) of the receipt of both the recorder processed image/video data and its corresponding history information, in step 256, this controller determines from the history information whether the recorder processed image/video data requires decompressing. If decompression is required, then in step 260, the controller 76 issues instructions to the decompressor 60 to decompress the recorder processed image/video data stored in the temporary image/video data storage 80. In one embodiment, the controller 76 provides the following information with the decompression instructions:
(a) data for accessing the recorder processed image/video data in the temporary image/video data storage 80; and
(b) data for accessing the fields of the corresponding history information that identify compression type and parameters used in compressing the recorder processed image/video data.

As one skilled in the art will understand, other information besides or in addition to (a) and (b) immediately above may be provided to the decompressor 60. Moreover, in one embodiment, the controller 76 may only notify the decompressor 60 of newly received (and stored) recorder processed image/video data and its corresponding history information, and subsequently, the decompressor determines whether decompression is to be applied, the type of decompression, and the parameters therefor. Note that the decompressed image/video data output by the decompressor 60 can be stored in the data storage 80 along with descriptor data identifying it as decompressed.

For ease of description, and whether the image/video data is decompressed or not in step 260, the resulting image/video data will be referred to as "decompressed image/video data" hereinbelow.

After (any) decompression of the recorder processed image/video data, in step 264 the controller 76 determines from the corresponding stored history data (any) enhancements to be performed on the decompressed image/video data, and issues corresponding instructions to the image/video enhancement processes manager 64 to perform any enhancements determined. In particular, the controller 76 determines whether (and to what extent) de-noising process 68 and sharpening process 72 are to be applied to the decompressed image/video data. Additionally, the controller 76 (or the image/video enhancement process manager 64) may determine whether further enhancements are to be applied to the decompressed image/video data such as one or more of auto-exposure, auto-white balance, and auto-focus. In one embodiment, de-noising (if any) is first applied, followed by the (any) application of one or more of auto-exposure, auto-white balance, and auto-focus, and finally sharpening. More particularly, the following enhancements may be performed depending on the history information:

(i) Increase the contrast or brightness of an image to regain or increase the dynamic range of the original image/video which was diminished too much; e.g., in compensating for recorder 20 processing performed due to a reduced available network bandwidth (or parameters related thereto). For example, when one or more denoising and sharpening processing techniques have been applied at the recorder 20 and such processing have removed both high and low frequencies to reduce the amount of network bandwidth, the resulting in the image/video can be inherently soft. For example, this can occur when image/video are processed at the recorder 20 to accommodate network transmissions that have a bit rate below 1500 Kbps for 640×480 video images.

(ii) Remove random, colored dots; e.g., such dots may particularly occur when at least a portion image/video data is transmitted wirelessly. Note that in at some embodiments, the history information may include data identifying whether the transmission from the recorder 20 includes a wireless transmission.

(iii) Upscaling of the image/video data can be enhanced by knowing the processing indicated in the history information as one skilled in the art will understand.

(iv) Detecting ringing or blockiness issues in the image/video data, and then applying a corresponding mitigation enhancement, as one skilled in the art will understand.

Subsequently, in step 268, upon the image/video enhancement processes manager 64 receiving instructions from the controller 76, the enhancement processes manager 64 sequentially activates the enhancement processes for, e.g., pipelining the decompressed image/video data there through as determined by the instructions, and storing the resulting enhanced image/video data in the image/video archive 84. Note that information can be associatively stored with the resulting enhanced image/video data for determining who or what can access the resulting enhanced image/video data. In various embodiments, one or more of the following data is associatively stored with the resulting enhanced image/video data for identifying those with access: an identification of the recorder 20, an identification of a user, subscriber, or owner of the recorder 20 from which the corresponding recorder processed image/video data was obtained.

Once the resulting enhanced image/video data is stored in the image/video archive 84, an authorized user may request access to or transmittal of such enhanced image/video data for viewing as one of skill in the art will understand.

The present disclosure has been presented for purposes of illustration and description. Further, the description herein is not intended to limit the present disclosure to the form disclosed herein. In particular, variation and modification commiserate with the above teachings, within the skill and knowledge of those having ordinary skill in the relevant art, are within the scope of the present disclosure. The present disclosure is further intended to explain the best mode presently known of practicing the invention as recited in the claims, and to enable others skilled in the art to utilize the present disclosure, or other embodiments derived therefrom, e.g., with the various modifications required by their particular application or uses of the present disclosure.

APPENDIX

De-Noising.

For simplicity, in the description hereinbelow, the following description and Table A1 provides further specificity.

Aggressive de-noising: De-noising that includes low pass filtering and median filtering combined with a high degree masking coefficients as one skilled in the art will understand, wherein by "high degree masking coefficients" is meant $\Sigma_{i-k}^{i+k} w(t)h(t)h(i-t)$ where k=32–47.

Moderate de-noising: De-noising that includes low pass filtering with masking coefficients having a smaller degree (e.g., in the range of 8-31) and in some circumstance activating a median filter, as one skilled in the art will understand.

Little/no de-noising: This term includes no de-noising, de-noising using no low pass filtering or very minor low pass filtering (e.g., "minor" means $\Sigma_{i-k}^{i+k} w(t)h(i-t)$ where k=0-7), and no median filtering, as one skilled in the art will understand.

Note that in the above description of terms, "Aggressive de-noising" provides more de-noising than "Moderate de-noising" which, in turn, provides more de-noising than "Little/no de-noising". In one embodiment, as one skilled in the art will understand, the above descriptions for de-noising may be identified more specifically as follows:

TABLE A1

| De-noising Description | De-noising Technique |
| --- | --- |
| Aggressive de-noising | Gaussian Blur 1.1-1.6, or high pass filter 218-230 |
| Moderate de-noising | Gaussian Blur 0.5-1.0, or high pass filter 230-240 |
| Little/no de-noising | None, or Gaussian Blur 0.01-0.04 (max = 255), or high pass filter 240-255 (max = 255) |

De-noising tends to make the resulting image or video appear smoother or homogenous. Such de-noising may be considered of benefit for an image/photo that does not show many small objects whose details need to be clear.

Sharpening.

Regarding sharpening, in the description hereinbelow, the following description and Table A2 provides further specificity.

Aggressive sharpening: Activation of a large Gaussian blur technique by the sharpening module 44 for processing digital image/video data, wherein by "large Gaussian blur" herein is meant mean 1.6 variance 5, as one skilled in the art will understand.

Moderate sharpening: Sharpening digital image/video data by performing a minor deconvolution, wherein by "minor deconvolution" herein means mean 0 variance 0.05, as one skilled in the art will understand.

Note that the terms "Aggressive sharpening" provides more sharpening than "Moderate sharpening" which, in turn, provides more sharpening than "Little/no sharpening". In one embodiment, as one skilled in the art will understand, the above descriptions for sharpening may be identified more specifically as follows:

TABLE A2

| Sharpening Description | Sharpening Technique |
| --- | --- |
| Aggressive sharpening | Amount 90-100%, wherein Radius is in a range of 4-6, and Threshold is in a range of 4-6. |
| Moderate sharpening | Amount 60-80%, wherein Radius is in a range of 1.3-2.5, and Threshold is in a range of 7-9. |
| Little/no sharpening | No sharpening,, or an Amount 20-40% (max 100%), wherein Radius is in a range of 0.2-1.0 (max = 250), and Threshold is in a range of 10-15 (max = 255). |

Compression.

Regarding compression, in the description hereinbelow, the following description and Table A3 provides further specificity.

Aggressive Compression: Activation of a high compression technique by the compressor module 36 for processing digital image/video data.

TABLE A3

| Compression Description | Compression Technique |
| --- | --- |
| Extremely Aggressive (High) Compression | M-JPEG at >101, or H.264 at greater than 401, or JPEG at greater than 101 |
| Aggressive (High) Compression | M-JPEG at 51-100, or H.264 at 201-400, or JPEG at 51-100 |
| Moderate Compression | M-JPEG at 11-50, or H.264 at 51-200, or JPEG at 11-50 |
| Little/no Compression | None, or M-JPEG at 2-10, or H.264 at 2-50, or JPEG at 2-10, or a loss less compression such as <6. |

What is claimed is:

1. A method for processing data, comprising:

obtaining network data related to a transmission characteristic for a telecommunications network;

obtaining first data at a first device operably in communication with a network site via the telecommunications network;

obtaining data for compressing the first data, the data for compressing for use in identifying one of a first data compression and a second data compression;

wherein for the network data being indicative of a first result of the transmission characteristic, the data for compressing is for identifying the first data compression, and for the network data being indicative of a more constrained second result of the transmission characteristic, the data for compressing is for identifying the second data compression, wherein the first data compression compresses data less than the second data compression;

enhancing the first data, or data derived therefrom, for obtaining enhanced data;

wherein the step of enhancing includes performing a first noise reduction resulting in the enhanced data having a first reduction in noise content when the data for compressing is for identifying the first data compression, and wherein the step of enhancing includes performing a second noise reduction resulting in the enhanced data having a second reduction in noise content when the data for compressing is for identifying the second data compression;

wherein, for the first data including video data, the first noise reduction reduces more noise in the enhanced data than the second noise reduction;

compressing the enhanced data with one of the first data compression and the second data compression according to the network data, thereby obtaining processed data;

obtaining history information indicative of processing of the first data to obtain the process data, wherein the history information includes compression description information related to the data for compressing, and including enhancement description information indicative of enhancements performed on the first data for obtaining the enhanced data; and transmitting the processed data and the history information, via the network, to the network site;

wherein following the transmission, the transmitted history information is accessed for decompressing the transmitted processed data when the transmitted processed data is compressed.

2. The method of claim 1, wherein at least most of the steps claim 1 are performed by the first device, and each of the first and second data compressions includes one of M-JPEG, H.264 or JPEG.

3. The method of claim 1, wherein each of the first and second noise reductions includes a Gaussian Blur, wherein a Gaussian Blur value for the first noise reduction is greater than a Gaussian Blur value for the second noise reduction.

4. The method of claim 1, wherein the transmission characteristic is dependent upon one of: an available network bandwidth, a network transmission time delay, a network data rate, and a maximum transmission time delay threshold.

5. The method of claim 4, wherein when the transmission characteristic is dependent upon the network transmission time delay, the first result is indicative of a lesser value for the network transmission time delay than the second result;

wherein the transmission characteristic is dependent upon the network data rate, the first result is indicative of a greater value for the network data rate than the second result;

wherein the transmission characteristic is dependent upon the maximum transmission time delay threshold, the first result is indicative of a greater value for the maximum transmission time delay threshold than the second result.

6. The method of claim 1, wherein the step of enhancing includes sharpening the first data or the data derived therefrom.

7. The method of claim 6, wherein the step of sharpening includes sharpening the first data or the data derived therefrom more when the second data compression compresses the enhanced data, as opposed to the first data compression compressing the enhanced data.

8. The method of claim 1, wherein the transmitted history information is accessed for enhancing the processed data by activating one or more of: a de-noising process, a sharpening process, an auto-exposure process, an auto-white balance process, and an auto-focus process.

9. The method of claim 1, further including a step of determining whether one or more of an auto-exposure, auto-white balance, and auto-focus is to be performed prior to the step of obtaining the first data, wherein the step of determining prevents at least one of the auto-exposure, auto-white balance, and auto-focus from being performed when the network data is indicative of an available network bandwidth below a predetermined threshold.

10. The method of claim 1, wherein the step of enhancing includes activating one of first sharpening process and a second sharpening process, wherein the first sharpening process sharpens the first data or data derived therefrom less than the second sharpening process;
   wherein the first sharpening process is activated when the first data compression is designated for compressing the enhanced data, or data derived therefrom; and
   wherein the second sharpening process is activated when the second data compression is designated for compressing the enhanced data, or data derived therefrom.

11. The method of claim 1, wherein the network site does not perform further video or image enhancement of the processed data.

12. A non-transitory computer-readable medium having machine instructions stored thereon, the instructions comprising:
   obtaining network data related to a transmission characteristic for a telecommunications network;
   obtaining first data at a first device operably in communication with a network site via the telecommunications network;
   obtaining data for compressing the first data, the data for compressing for use in identifying one of a first data compression and a second data compression;
   wherein for the network data being indicative of a first result of the transmission characteristic, the data for compressing is for identifying the first data compression, and for the network data being indicative of a more constrained second result of the transmission characteristic, the data for compressing is for identifying the second data compression, wherein the first data compression compresses data less than the second data compression;
   enhancing the first data, or data derived therefrom, for obtaining enhanced data;
   wherein the step of enhancing includes performing a first noise reduction resulting in the enhanced data having a first reduction in noise content when the data for compressing is used in determining the first data compression, and
   wherein the step of enhancing includes performing a second noise reduction resulting in the enhanced data having a second reduction in noise content when the data for compressing is used in determining the second data compression;
   wherein, for first data including video data, the first noise reduction is identified for reducing more noise in the enhanced data than the second noise reduction;
   compressing the enhanced data with one of the first data compression and the second data compression according to the network data, thereby obtaining processed data;
   obtaining history information indicative of processing of the first data, wherein the history information includes compression description information related to the data for compressing, and including enhancement description information indicative of enhancements performed on the first data for obtaining the enhanced data; and
   transmitting the processed data and the history information, via the network, to the network site;
   wherein following the transmission, the transmitted history information is accessed for decompressing the transmitted processed data when the transmitted processed data is compressed.

13. The computer readable medium of claim 12, wherein for at least most of the steps of claim 8, the machine instructions for performing the step reside on the first device, and the first device is a hand-held mobile communications device.

14. The computer readable medium of claim 12, wherein the machine instructions include instructions for comparing the network data with data indicative of a bandwidth extent of the network.

15. The computer readable medium of claim 12, wherein the step of enhancing includes de-noising one of the processed data or the decompressed data, wherein the de-noising reduces one of: a salt and pepper noise or a Gaussian noise.

16. A system for processing image or video data comprising:
   an image or video recorder comprising:
      (a) an image or video generator for generating image or video data;
      (b) one or more enhancement processes for enhancing the image or video data, or a version derived therefrom resulting in enhanced data, wherein the enhancement processes include at least one noise reduction process;
      (c) a compressor for compressing the enhanced data resulting in recorder processed data;
      (d) an evaluator for determining whether (i) network data, related to a transmission characteristic for a network in operable communication with the recorder, is indicative of (ii) a first specification of the transmission characteristic or a second specification of the transmission characteristic;
         wherein the first specification is indicative of more constrained operational condition for performing a transmission on the network;
         wherein the first specification corresponds to a first data compression, and the second specification corresponds to a second data compression;
         wherein the first data compression compresses data less than the second data compression;
         wherein prior to the first data compression being performed on the enhanced data, a first noise reduction is performed by the at least one noise reduction process for obtaining the enhanced data having a first reduction in noise content, and
         wherein prior to the second data compression being performed on the enhanced data, a second noise reduction is performed by the at least one noise reduction process for obtaining the enhanced data having a second reduction in noise content;
         wherein the first noise reduction and the second noise reduction reduce different amounts of noise;
   wherein history information indicative of processing of the image or video data to yield the recorder processed data is obtained, wherein the history information includes compression description information related to which of the first and second data compressions were performed, and including enhancement description information indicative of the enhancement processes performed to obtain the enhanced data; and
      (e) an interface to the network for transmitting the recorder processed data and the history information, via the network, to a predetermined network site;
   wherein following the network transmission, the transmitted history information is accessed for decompressing the transmitted recorder processed data.

17. The system of claim 16, wherein the evaluator compares the network data with data indicative of a predetermined available bandwidth for the network.

18. The system of claim 16, wherein the enhancement processes includes a sharpening process for sharpening the image or video data, or a version derived therefrom, wherein the sharpening is decreased when the first data compression is performed, and the sharpening is increased when the second data compression is performed.

19. The system of claim 16 further including a controller for preventing or reducing one of an auto-exposure, an auto-white balance, and an auto-focus from being performed at the image or video recorder when the network data is indicative of a reduced available network bandwidth.

20. The system of claim 16, wherein the at least one noise reduction process includes Gaussian Blur or a high pass filter.

21. The system of claim 16 further including a controller for outputting information related to selecting a noise reduction process to perform as one of the first and second noise reductions, wherein when the image or video data includes video data, the noise reduction process is selected as being inversely related to the amount of data compression for performing.

22. The system of claim 16 further including a controller for outputting information related to selecting a noise reduction process to perform as one of the first and second noise reductions, wherein when the image or video data includes non-video data, the noise reduction process is selected as being directly related to the amount of data compression for performing.

* * * * *